(12) United States Patent
Bay et al.

(10) Patent No.: US 11,875,457 B2
(45) Date of Patent: Jan. 16, 2024

(54) 3D PRODUCT RECONSTRUCTION FROM MULTIPLE IMAGES COLLECTED AT CHECKOUT LANES

(71) Applicant: ZEBRA TECHNOLOGIES CORPORATION, Lincolnshire, IL (US)

(72) Inventors: Alessandro Bay, London (GB); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/677,686

(22) Filed: Feb. 22, 2022

(65) Prior Publication Data

US 2023/0267685 A1    Aug. 24, 2023

(51) Int. Cl.
| | |
|---|---|
| *G06T 17/20* | (2006.01) |
| *G06T 7/70* | (2017.01) |
| *G06T 7/194* | (2017.01) |
| *G06T 7/50* | (2017.01) |
| *G06T 7/40* | (2017.01) |
| *G06T 15/04* | (2011.01) |

(Continued)

(52) U.S. Cl.
CPC ............ *G06T 17/20* (2013.01); *G06K 7/1413* (2013.01); *G06Q 20/208* (2013.01); *G06T 7/194* (2017.01); *G06T 7/40* (2013.01); *G06T 7/50* (2017.01); *G06T 7/70* (2017.01); *G06T 15/04* (2013.01); *G06V 10/764* (2022.01); *G06V 10/82* (2022.01); *G06T 2207/10024* (2013.01); *G06T 2207/10028* (2013.01)

(58) Field of Classification Search
None
See application file for complete search history.

(56) References Cited

U.S. PATENT DOCUMENTS

2009/0267895 A1* 10/2009 Bunch ................. G06F 3/03543
345/157
2015/0310601 A1   10/2015 Rodriguez et al.
(Continued)

OTHER PUBLICATIONS

International Search Report and Written Opinion for International Application No. PCT/US2023/13561 dated May 3, 2023.

*Primary Examiner* — Anh-Tuan V Nguyen
(74) *Attorney, Agent, or Firm* — Yuri Astvatsaturov

(57) ABSTRACT

Techniques for three-dimensional product reconstruction using multiple images collected at checkout lanes are disclosed herein. An example method includes capturing, by a barcode reader associated with a point of sale (POS) workstation, first image data associated with each of a plurality of products passing through a product scanning region of the POS workstation; analyzing barcode data from the first image data captured by the barcode reader to identify each product of the plurality of products passing through the product scanning region of the POS workstation; capturing, by one or more color cameras associated with the POS workstation, second image data associated with the identified product, of the plurality of products passing through the product scanning region of the POS workstation; and generating, by a processor, a textured three-dimensional mesh reconstruction for the identified product based on the second image data associated with the identified product.

10 Claims, 13 Drawing Sheets

(51) Int. Cl.
*G06V 10/82* (2022.01)
*G06V 10/764* (2022.01)
*G06K 7/14* (2006.01)
*G06Q 20/20* (2012.01)

(56) References Cited

U.S. PATENT DOCUMENTS

| | | | |
|---|---|---|---|
| 2016/0012646 A1* | 1/2016 | Huang | G06T 5/005 |
| | | | 345/419 |
| 2017/0105601 A1* | 4/2017 | Pheiffer | A61B 34/30 |
| 2018/0314867 A1* | 11/2018 | Kotula | G06K 7/1413 |
| 2019/0033461 A1* | 1/2019 | Wingert | G01B 11/24 |
| 2019/0108503 A1* | 4/2019 | Miyakoshi | G06V 20/00 |
| 2019/0188513 A1* | 6/2019 | Beghtol | G07G 1/0045 |
| 2020/0043195 A1* | 2/2020 | Ono | G06T 3/4038 |
| 2020/0097892 A1* | 3/2020 | Cheng | G06K 7/1417 |
| 2020/0372228 A1 | 11/2020 | Rodriguez et al. | |
| 2021/0012568 A1* | 1/2021 | Michielin | G06T 3/0093 |
| 2021/0035084 A1 | 2/2021 | Afraite-Seugnet | |
| 2021/0142105 A1* | 5/2021 | Siskind | G06T 11/60 |
| 2021/0153479 A1* | 5/2021 | Mindel | G06V 40/10 |
| 2022/0343660 A1* | 10/2022 | Yang | G07G 1/0063 |

* cited by examiner

Marketing

Information

360 View

3D PRODUCT RECONSTRUCTION FROM MULTIPLE IMAGES COLLECTED AT CHECKOUT LANES

BACKGROUND

Brands and retailers use consumer packaged goods (CPG) images to provide relevant product information that is conveniently accessible to consumers. Generally speaking, CPG images may include three-dimensional images that realistically depict the real-life shape and texture of a retail product, including all on-package data and imagery (e.g., ingredients, nutritional information, weights, dimensions, etc.). These CPG images may be used, for instance, to show consumers which products are offered by a retailer. For example, a consumer may select CPG images of products for grocery pickup or delivery from a retailer.

Currently, generating a three-dimensional CPG image for a product is a time-consuming and tedious process for a retailer. For each product, images corresponding to each face or side of the product must be obtained in order to generate a single three-dimensional CPG image. For instance, a worker may be required to take photographs of each product from several prescribed angles in order to capture images corresponding to each face or side of the product. This process must then be repeated for each of the tens of thousands of different products that a typical retailer carries, and updated whenever a product's packaging is updated (e.g., when the shape of the package, the images or text thereon, or any logos are redesigned or seasonally modified by the producer of the product), or when new products are added to the retailer's inventory, in order for the retailer to provide up-to-date three-dimensional CPG images for their products.

SUMMARY

In an embodiment, the present invention is a method for three-dimensional product reconstruction using multiple images collected at POS workstations, comprising: capturing, by a barcode reader associated with a point of sale (POS) workstation, first image data associated with a plurality of products passing through a product scanning region of the POS workstation; analyzing barcode data from the first image data captured by the barcode reader to identify at least some of the plurality of products passing through the product scanning region of the POS workstation; responsive to identifying a product, from the plurality of products, resulting in an identified product, capturing, by one or more color cameras associated with the POS workstation, second image data associated with the identified product; and generating, by a processor, a textured three-dimensional mesh reconstruction for the identified product based on the second image data associated with the identified product.

In a variation of this embodiment, generating the textured three-dimensional mesh reconstruction associated with each identified product based on the second image data associated with each identified product includes: for each image of the second image data associated with each identified product: segmenting, by the processor, the identified product from the background, or any hands in the image; analyzing, by the processor, the segmented image of the identified product to determine a depth and a texture associated with each pixel of the identified product in the image; and generating, by the processor, a three-dimensional point cloud associated with the segmented image of the identified product based on the depth and the texture associated with each pixel of the identified product; and stitching, by the processor, the three-dimensional point clouds associated with each image of the second image data associated with the identified product together to generate a textured three-dimensional mesh reconstruction associated with the identified product.

For example, in a variation of this embodiment, stitching, by the processor, the three-dimensional point cloud associated with each image of the second image data associated with each identified product together to generate a textured three-dimensional mesh reconstruction associated with the product may include: for each three-dimensional point cloud associated with each identified product: identifying, by the processor, a location of a barcode or other product label in the three-dimensional point cloud; and determining, by the processor, an orientation of the product in the three-dimensional point cloud based on the identified location of the barcode or other product label in the three-dimensional point cloud; and stitching, by the processor, the three-dimensional point clouds associated with each image of the second image data associated with each identified product together to generate the textured three-dimensional mesh reconstruction associated with the product, based on the determined orientation of the product in each three-dimensional point cloud.

Additionally, in a variation of this embodiment, generating the textured three-dimensional mesh reconstruction for each identified product based on the second image data associated with each identified product includes: for each identified product, determining, by the processor, an indication of a shape associated with the identified product; generating, by the processor, a three-dimensional mesh associated with the identified product based on the indication of the shape associated with the identified product; and stitching, by the processor, the second image data associated with the identified product to the three-dimensional mesh associated with the identified product in order to generate a textured three-dimensional mesh associated with the identified product.

In some examples, in a variation of this embodiment, determining the indication of the shape associated with the identified product includes accessing, by the processor, a database storing an indication of product shapes associated with each identified product.

Additionally, in some examples, in a variation of this embodiment, determining the indication of the shape associated with the product shown in the image includes for at least one image of the second image data associated with each identified product: segmenting, by the processor, the identified product from the background, or any hands in the image; and analyzing, by the processor, the segmented image of the identified product using a neural network to classify the shape associated with the identified product as one of a plurality of possible product shapes.

Furthermore, in some examples, in a variation of this embodiment, stitching the second image data associated with the identified product to the three-dimensional mesh associated with the identified product in order to generate the textured three-dimensional mesh associated with the identified product includes: for each image of the second image data associated with each identified product: segmenting, by the processor, the identified product from the background, or any hands in the image; identifying, by the processor, a location of a barcode or other product label in the image; and determining, by the processor, an orientation of the product in the image based on the identified location of the barcode or other product label in the image; and stitching, by the processor, each image of the second image data associated with the identified product to the three-dimensional mesh associated with the identified product based on the orientation of the product in each image of the second image data associated with the identified product.

In another embodiment, the present invention is a system for three-dimensional product reconstruction using multiple images collected at POS workstations, comprising: a barcode reader associated with a point of sale (POS) workstation configured to capture first image data associated with a plurality of products passing through a product scanning region of the POS workstation and analyze barcode data from the first image data to identify at least some of the plurality of products passing through the product scanning region of the POS workstation; one or more color cameras associated with the POS workstation configured to, responsive to the barcode reader identifying a product, from the plurality of products, resulting in an identified product, capture second image data associated with the identified product; a processor; and a memory storing non-transitory, computer-readable instructions, that, when executed by the processor, cause the processor to generate a textured three-dimensional mesh reconstruction for the identified product based on the second image data associated with the identified product.

In a variation of this embodiment, the instructions, that cause the processor to generate the textured three-dimensional mesh reconstruction associated with each identified product based on the second image data associated with each identified product, include instructions that cause the processor to: for each image of the second image data associated with each identified product: segment the identified product from the background, or any hands in the image; analyze the segmented image of the identified product to determine a depth and a texture associated with each pixel of the identified product in the image; and generate a three-dimensional point cloud associated with the segmented image of the identified product based on the depth and the texture associated with each pixel of the identified product; and stitch the three-dimensional point clouds associated with each image of the second image data associated with the identified product together to generate a textured three-dimensional mesh reconstruction associated with the identified product.

For example, in a variation of this embodiment, the instructions, that cause the processor to stitch the three-dimensional point cloud associated with each image of the second image data associated with each identified product together to generate a textured three-dimensional mesh reconstruction associated with the product, include instructions that cause the processor to: for each three-dimensional point cloud associated with each identified product, identify a location of a barcode or other product label in the three-dimensional point cloud; and determine an orientation of the product in the three-dimensional point cloud based on the identified location of the barcode or other product label in the three-dimensional point cloud; and stitch the three-dimensional point clouds associated with each image of the second image data associated with each identified product together to generate the textured three-dimensional mesh reconstruction associated with the product, based on the determined orientation of the product in each three-dimensional point cloud.

Additionally, in a variation of this embodiment, the instructions, that cause the processor to generate the textured three-dimensional mesh reconstruction for each identified product based on the second image data associated with each identified product, include instructions that cause the processor to: for each identified product, determine an indication of a shape associated with the identified product; generate a three-dimensional mesh associated with the identified product based on the indication of the shape associated with the identified product; and stitch the second image data associated with the identified product to the three-dimensional mesh associated with the identified product in order to generate a textured three-dimensional mesh associated with the identified product.

In some examples, in a variation of this embodiment, the instructions, that cause the processor to determine the indication of the shape associated with the identified product, include instructions that cause the processor to access a database storing an indication of product shapes associated with each identified product.

Moreover, in some examples, in a variation of this embodiment, the instructions, that cause the processor to determine the indication of the shape associated with the product shown in the image, include instructions causing the processor to: for at least one image of the second image data associated with each identified product: segment the identified product from the background, or any hands in the image; and analyze the segmented image of the identified product using a neural network to classify the shape associated with the identified product as one of a plurality of possible product shapes.

Furthermore, in some examples, in a variation of this embodiment, the instructions, that cause the processor to stitch the second image data associated with the identified product to the three-dimensional mesh associated with the identified product in order to generate the textured three-dimensional mesh associated with the identified product, include instructions that cause the processor to: for each image of the second image data associated with each identified product: segment the identified product from the background, or any hands in the image; identify a location of a barcode or other product label in the image; and determine an orientation of the product in the image based on the identified location of the barcode or other product label in the image; and stitch each image of the second image data associated with the identified product to the three-dimensional mesh associated with the identified product based on the orientation of the product in each image of the second image data associated with the identified product.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
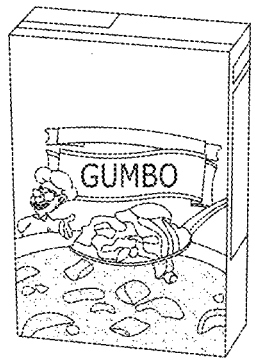
FIGS. 1A-1B illustrate examples of three-dimensional CPG images, viewed from several different angles, in accordance with some examples provided herein.
Figure 1A:
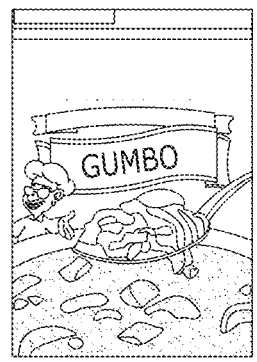
Figure 1A:
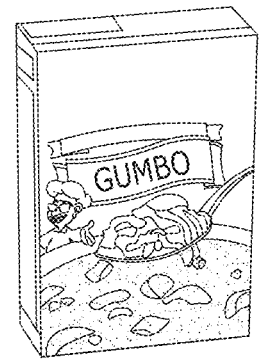
Figure 1A:
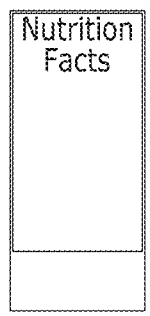
Figure 1A:
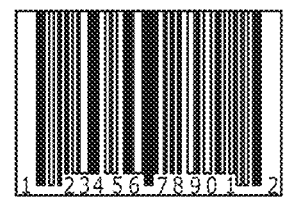
Figure 1A:
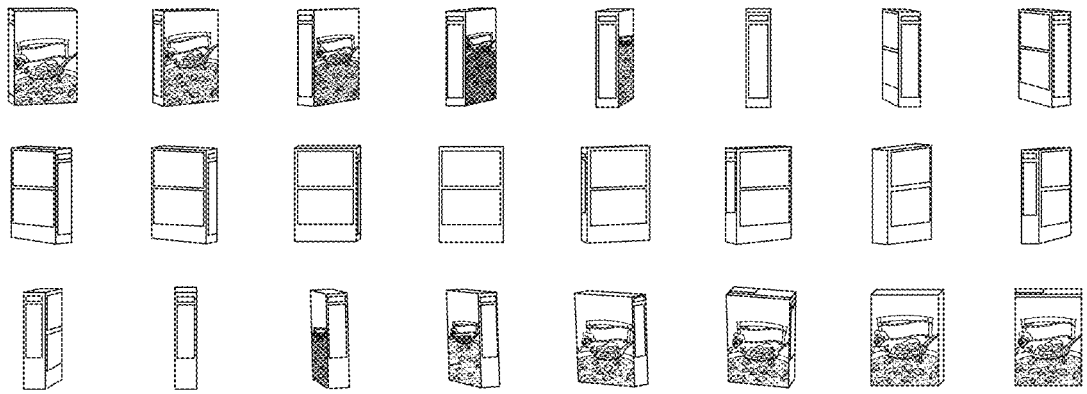

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1B:
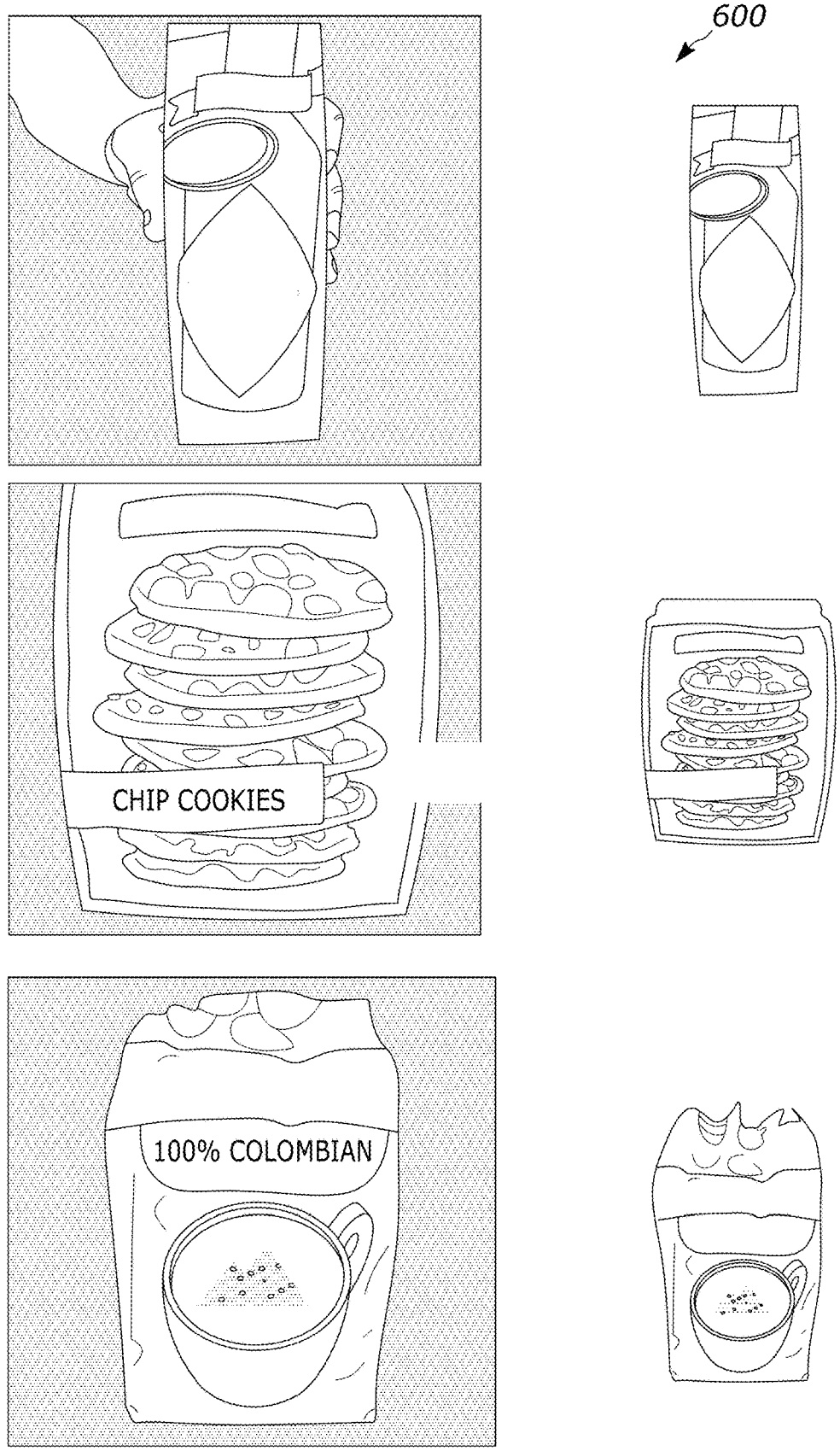
Figure 2:
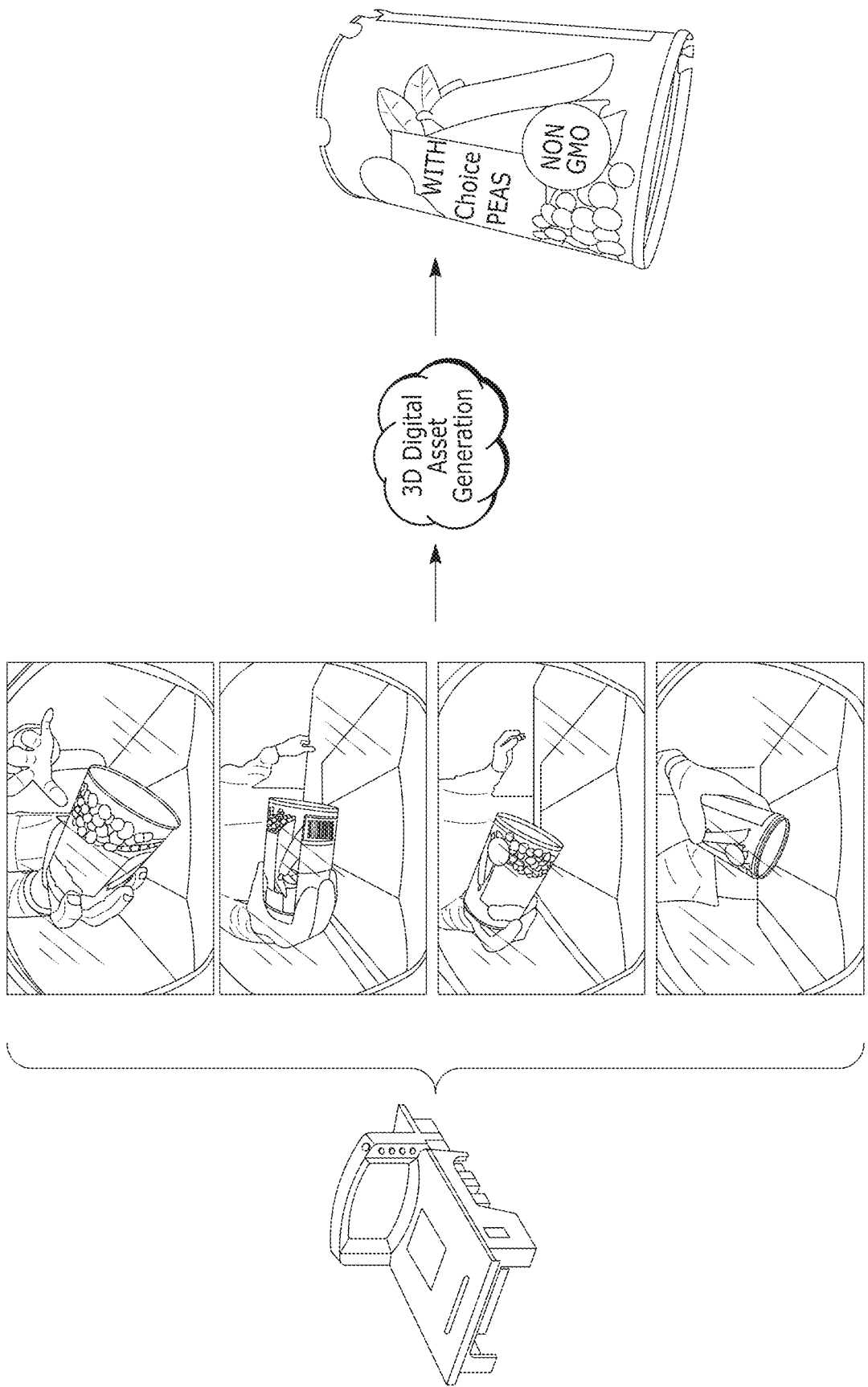
FIGS. 2 and 3 illustrate images associated with example methods for three-dimensional product reconstruction using multiple images collected at POS workstations, in accordance with some examples provided herein.
Figure 3:
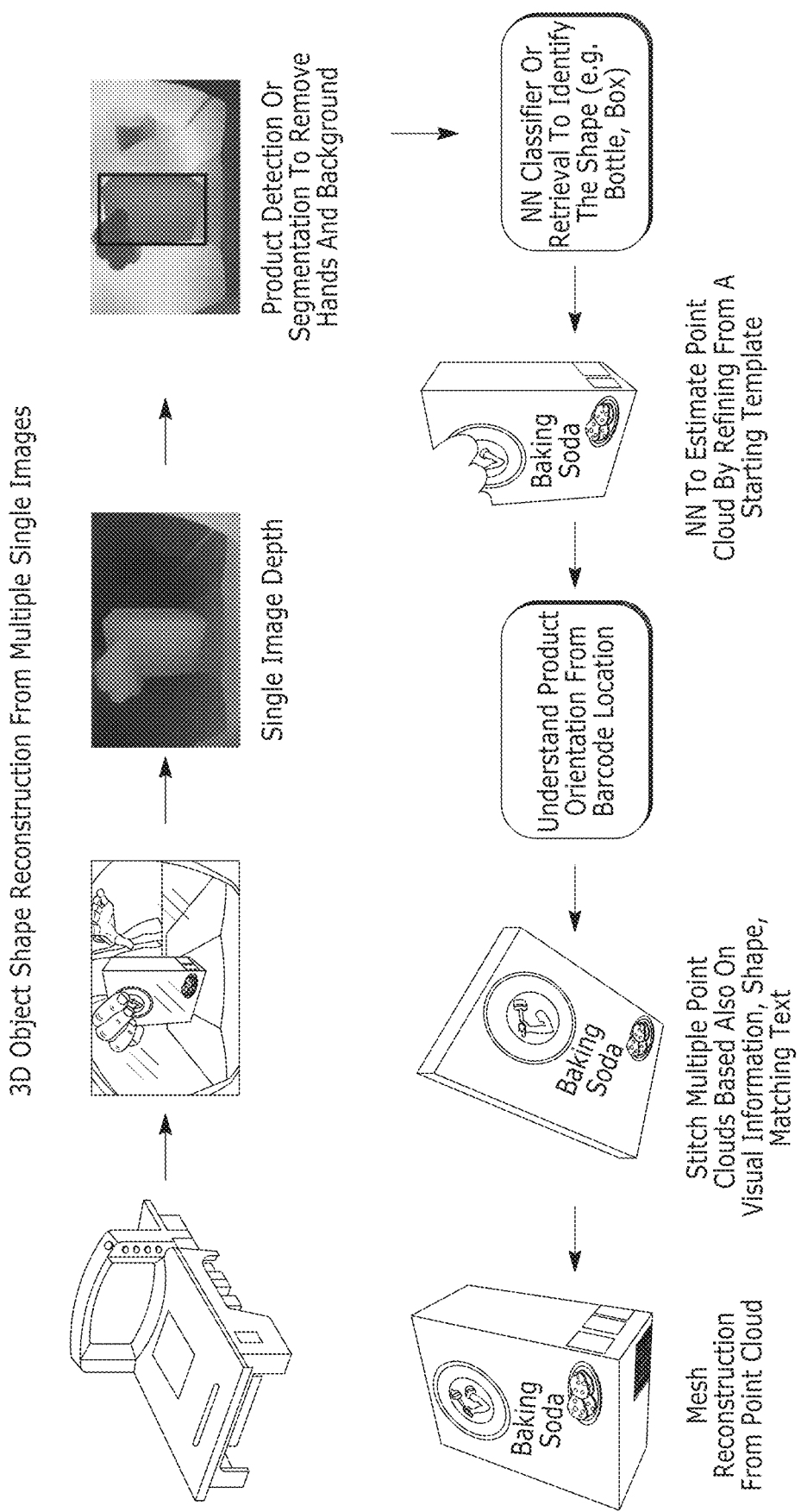
Figure 4:
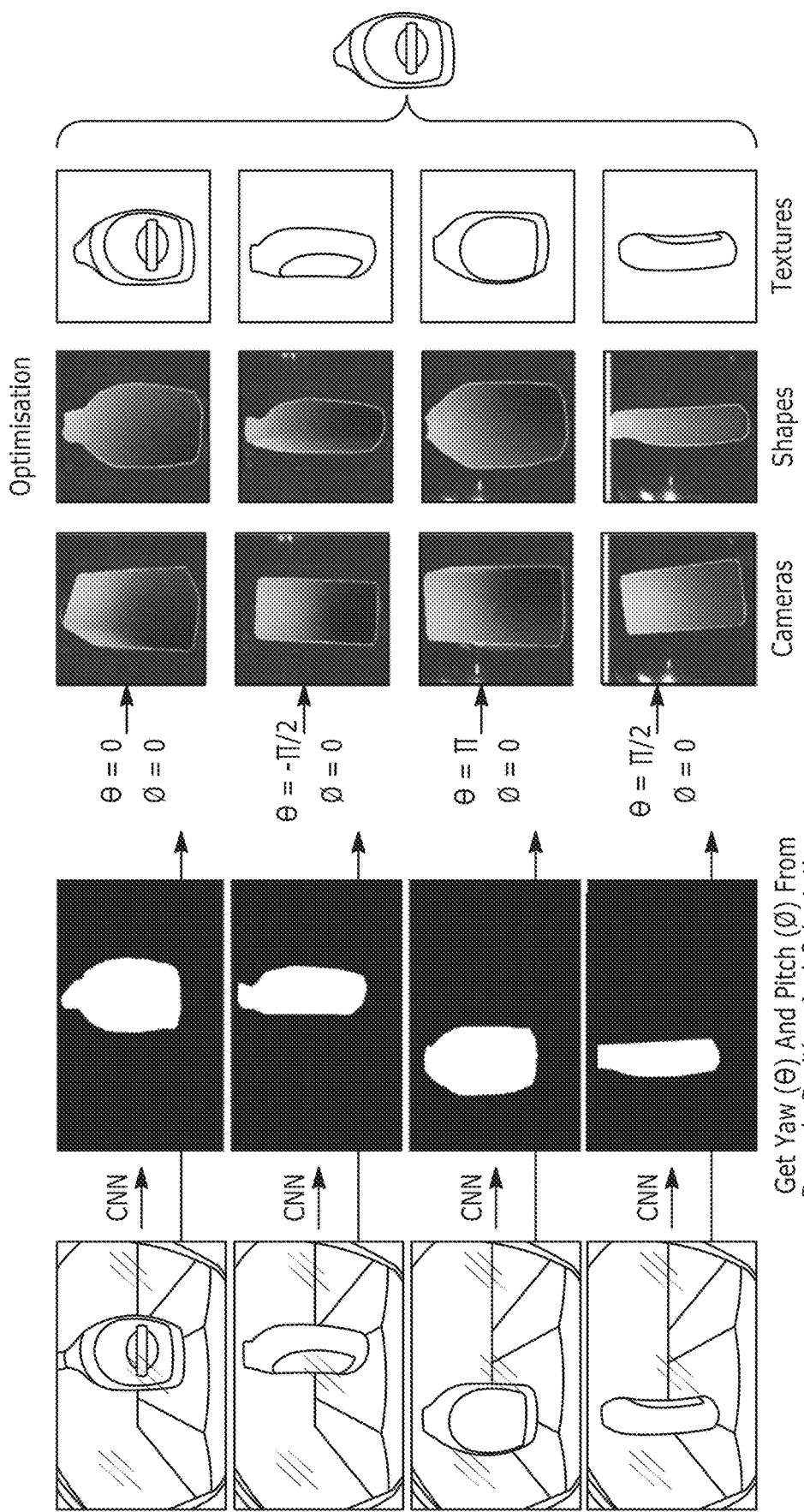
FIG. 4 illustrates images associated with an example method for orienting product images based on the location of a barcode or other product label in order to generate a three-dimensional product reconstruction using multiple images collected at POS workstations, in accordance with some examples provided herein.

The techniques provided herein utilize images that are already captured by point of sale (POS) workstations as consumers purchase products in a retail environment to generate three-dimensional CPG images for these products. FIGS. 1A-1B illustrate examples 600 of three-dimensional CPG images, viewed from several different angles. In particular, using the techniques provided herein, as a product is being purchased, a barcode reader associated with the POS workstation may capture image data associated with a barcode affixed to the product in order to identify the product. Once the product is identified, one or more other color cameras associated with the POS workstation may capture image data associated with the identified product. Thus, the images captured by the color cameras may be automatically categorized by product, based on which product was identified by the barcode reader. Over time, a large number of images of each product from various angles may be captured as customers purchase products in the retail environment, without additional burden on workers to intentionally capture images of each product from several prescribed angles. The images associated with each product may then be stitched together to generate a textured three-dimensional image representing the product, e.g., as shown at FIGS. 2 and 3. In some examples, the position of a barcode, or the position of a logo or other label on the packaging of the product, may be used to orient the images in order to stich the images together to generate the textured three-dimensional image representing the product, e.g., as shown at FIG. 4.

Figure 5:
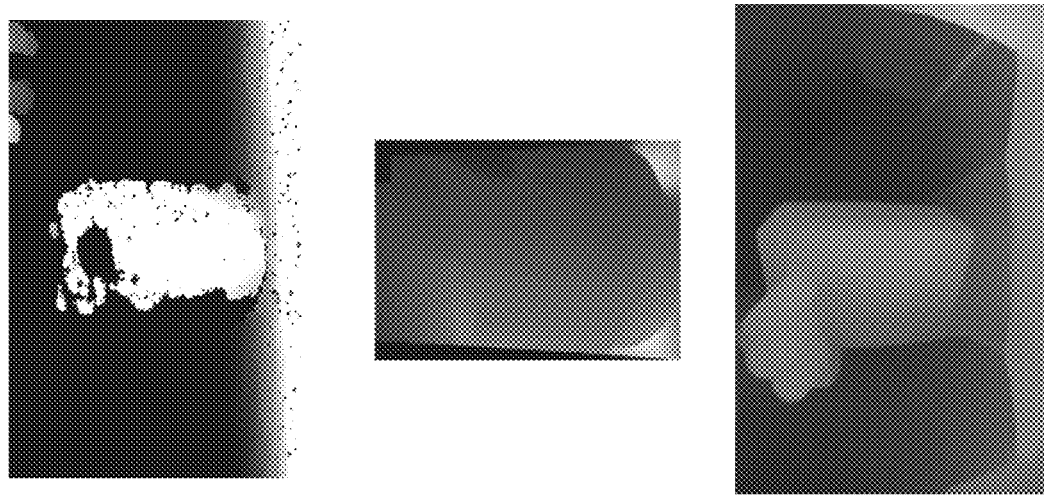
FIG. 5 illustrates images associated with a method for determining depths and textures of pixels of a two-dimensional image associated with a product, in accordance with some examples provided herein.
Figure 5:
Figure 5:
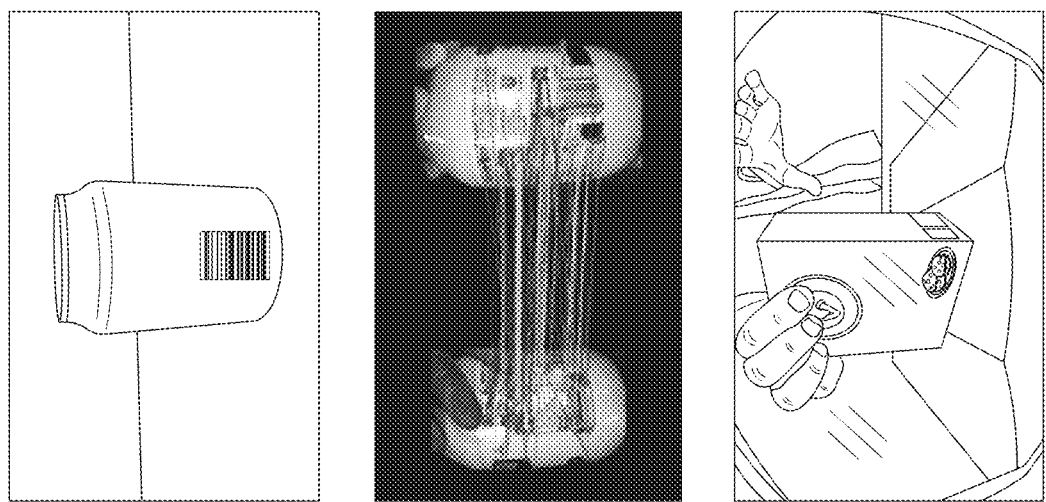
Figure 6:
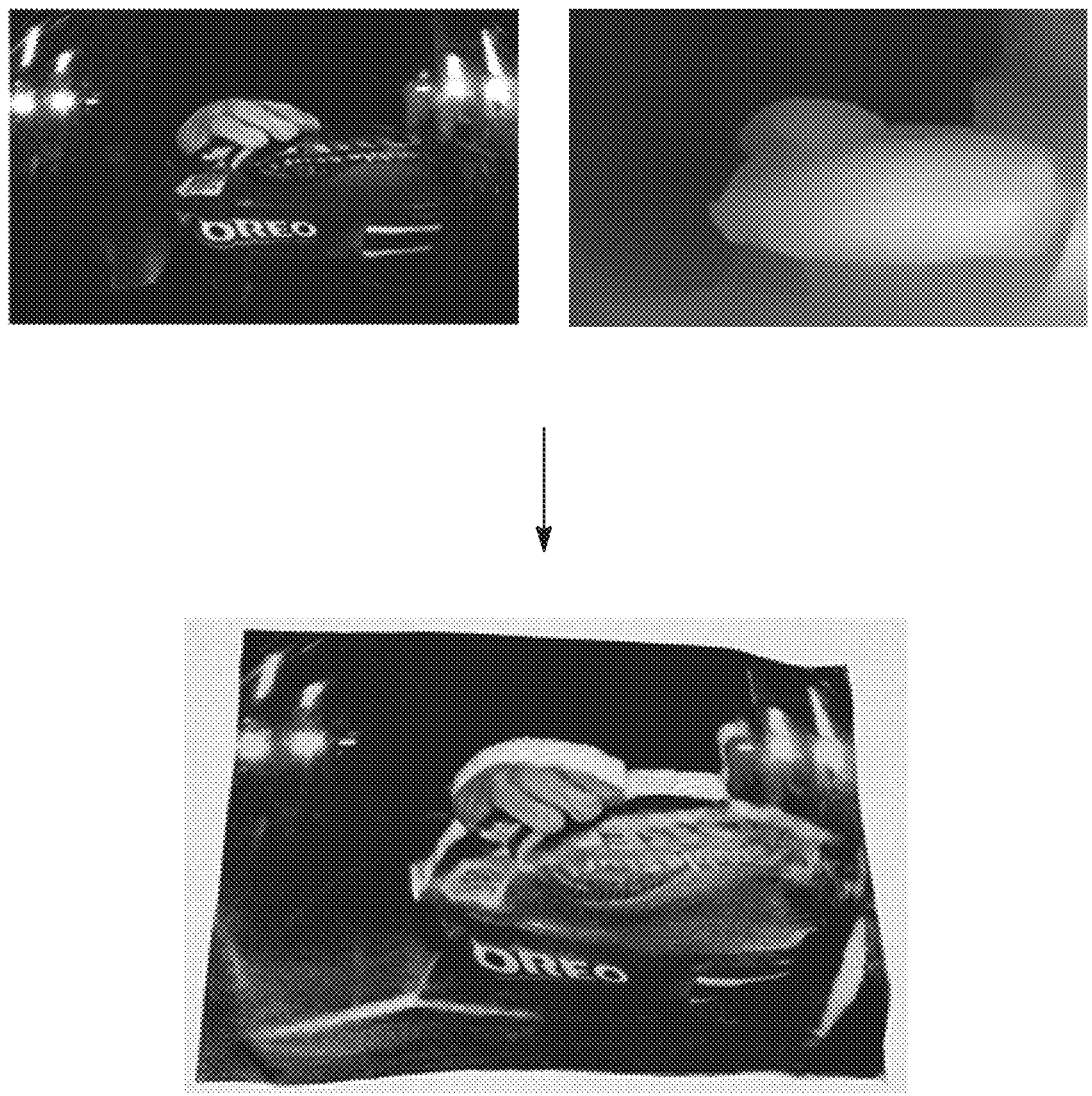
FIG. 6 illustrates images associated with a method for generating a textured three-dimensional point clouds based on the depth and texture of each pixel of an image of a product, in accordance with some examples provided herein.
Figure 7:
FIG. 7 illustrates images associated with a method for stitching together several three-dimensional point clouds associated with a particular product in order to generate a textured three-dimensional mesh representing the product, in accordance with some examples provided herein.
Figure 7:
Figure 7:
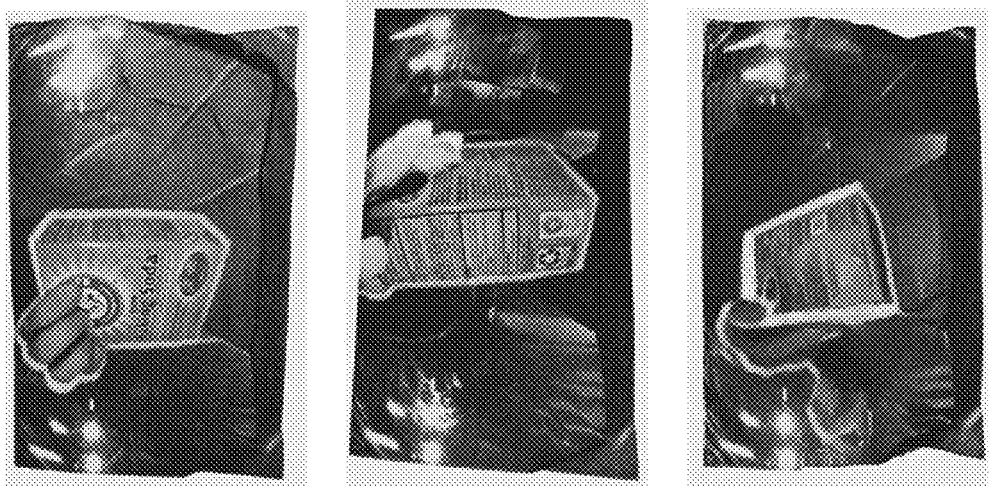

For instance, in some examples, the depth and texture of each pixel of each (two-dimensional image) associated with the product may be determined, e.g., as shown at FIG. 5, and a textured three-dimensional point cloud may be generated based on the depth and texture of each pixel of the image, e.g., as shown at FIG. 6. The textured three-dimensional point clouds for each image associated with the product may be oriented with respect to one another based on the position of the position of a barcode, or the position of a logo or other label on the packaging of the product. Once oriented, the textured three-dimensional point clouds may be stitched together in order to generate a textured three-dimensional mesh representing the product, e.g., as shown at FIG. 7

Figure 8:
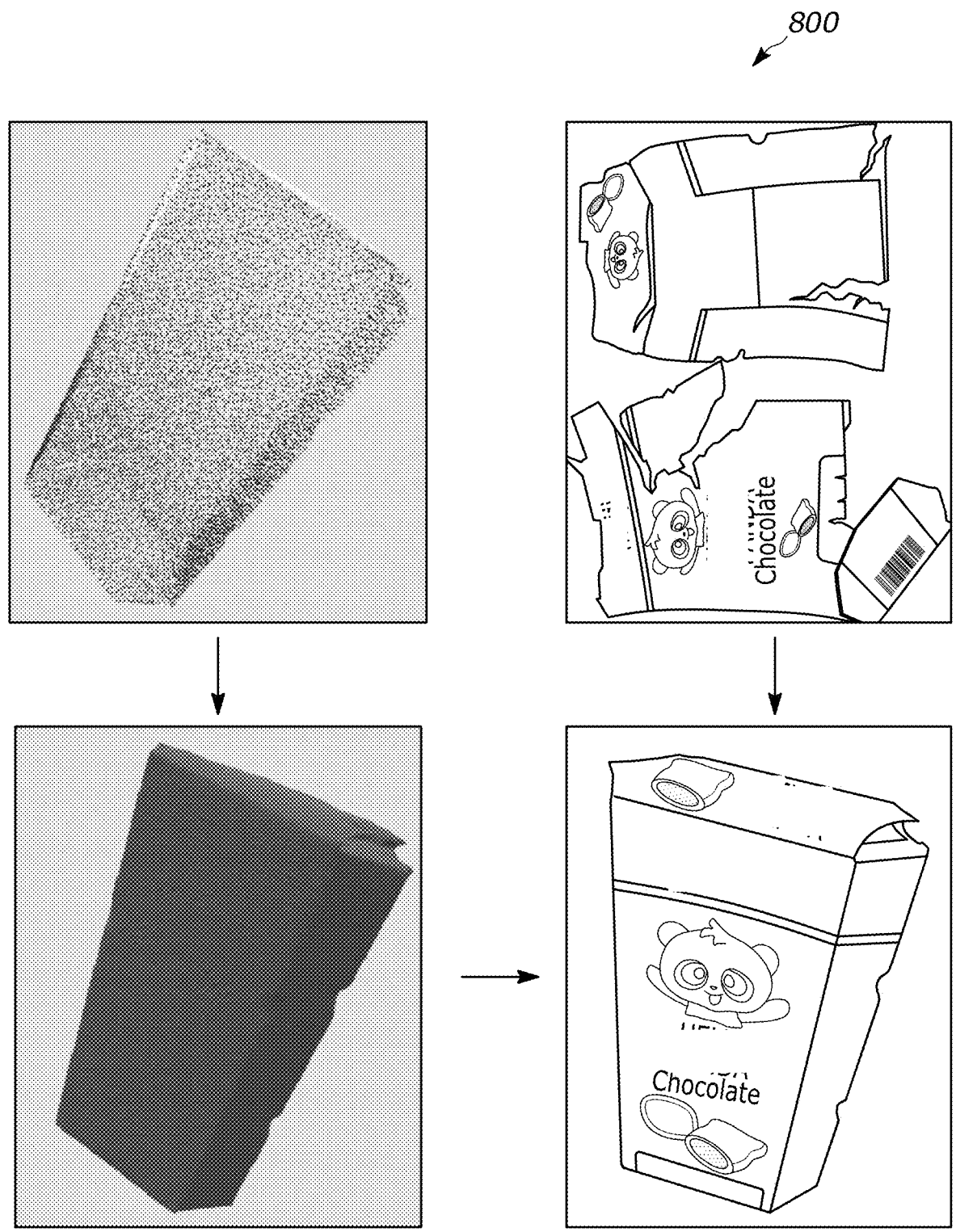
FIG. 8 illustrates images associated with a method for stitching two-dimensional images associated with a product to a three-dimensional mesh shape associated with the product, in accordance with some examples provided herein.

In other examples, each (two-dimensional) image associated with the product may be oriented with respect to one another based on the position of the position of a barcode, or the position of a logo or other label on the packaging of the product, in each image. Once oriented, the two-dimensional images may be stitched together with a three-dimensional mesh shape associated with the product in order to generate a textured three-dimensional mesh representing the product. For instance, the three-dimensional mesh shape associated with the product may be determined based on the identified product, e.g., by accessing a database listing three-dimensional shapes associated with each of the products in the inventory of the retail environment. As another example, the three-dimensional mesh shape associated with the product may be determined based on a neural network analysis of the two-dimensional images associated with the product. In either case, the two-dimensional images associated with the product may be stitched to the three-dimensional mesh shape associated with the product based on their orientation, e.g., as shown via the images 800 at FIG. 8.

Advantageously, the techniques provided herein allow retailers to automatically generate three-dimensional CPG images for products in their stores, including product details, product packaging, product images, etc. The techniques provided herein provide a process that is automatic, crowdsourced, and able to standardize the creation and the level of information being created for each product.

Figure 9:
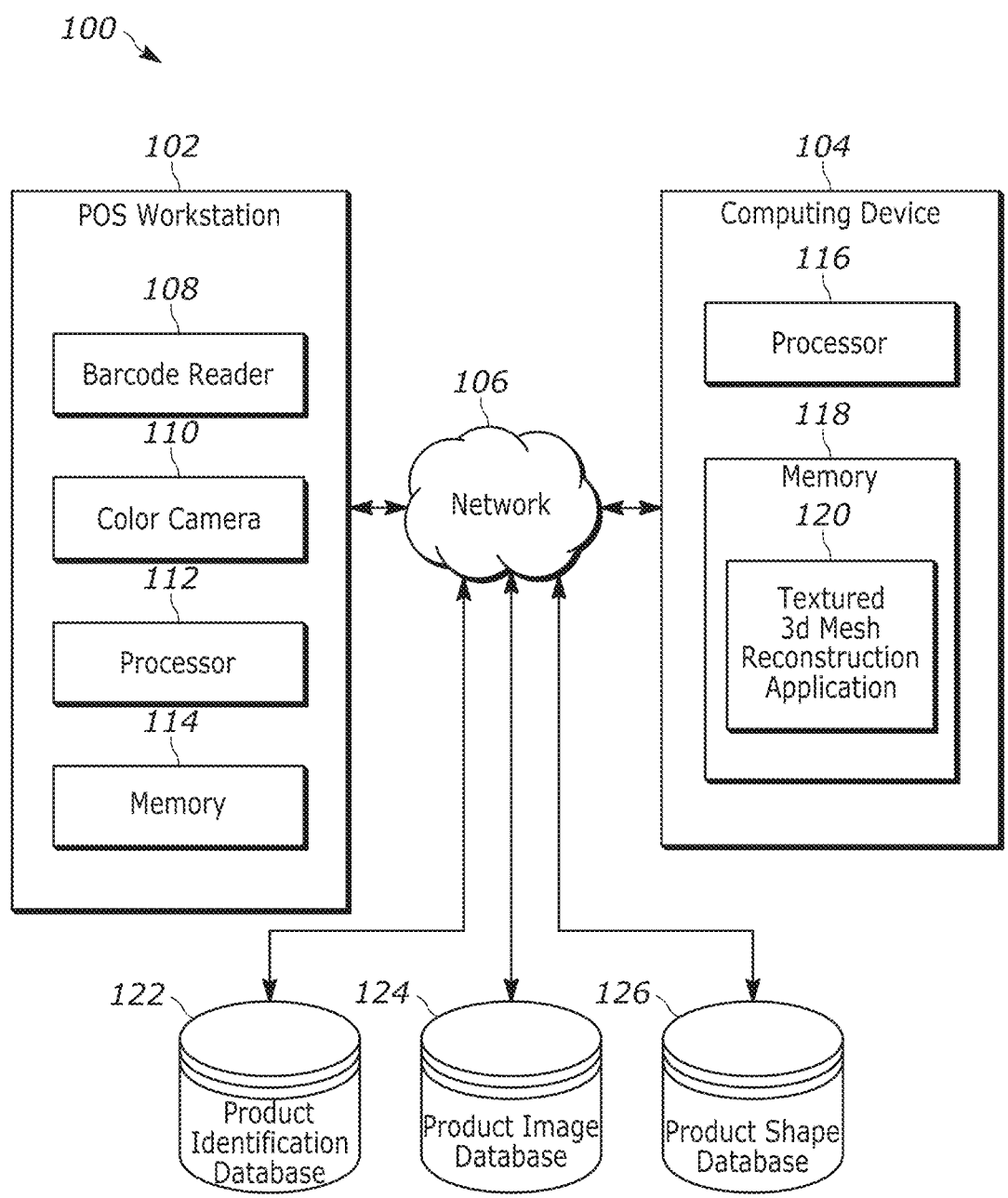
FIG. 9 illustrates a block diagram of an example system for three-dimensional product reconstruction using multiple images collected at POS workstations, in accordance with some examples provided herein.

FIG. 9 illustrates a block diagram of an example system 100 for textured three-dimensional product reconstruction using multiple images collected at POS workstations. The high-level architecture illustrated in FIG. 9 may include both hardware and software applications, as well as various data communications channels for communicating data between the various hardware and software components, as is described below.

The system 100 may include a POS workstation 102 and a computing device 104, which may be configured to communicate with one another via a network 106, which may be a wired or wireless network. While the POS workstation 102 and the computing device 104 are illustrated as two separate devices, in some examples, operations described herein as being performed by the POS workstation 102 and the computing device 104 may be performed by the same device. Moreover, in some examples, the system 100 may include additional devices configured to perform one or more of the operations described herein as being performed by the POS workstation 102 and/or the computing device 104.

The POS workstation 102 may include a barcode reader 108, one or more color cameras 110, which may be internal or external to the POS workstation 102, a processor 112, and a memory 114. The processor 112, which may be, for example, one or more microprocessors, controllers, and/or any suitable type of processors, may interact with the memory 114 accessible by the one or more processors 112 (e.g., via a memory controller) to obtain, for example, computer-readable instructions stored in the memory 114. The computer-readable instructions stored in the memory 114 may cause the one or more processors 112 to execute one or more applications stored in the memory 114.

Executing the one or more applications stored in the memory 114 may include causing the barcode reader 108 to capture first image data (which, in some cases, may be not be color image data) associated with products as they pass through a product scanning region and analyzing the first image data to identify the products passing through the product scanning region based on barcodes or other product label associated with each item. For instance, in some examples, identifying a product may include comparing a payload of a barcode associated with the product to a database (e.g., database 122) storing indications of identifications (e.g., SKU numbers) of products associated with each barcode payload. Furthermore, executing the one or more applications stored in the memory 114 may include causing the one or more color cameras 110 to capture second image data associated with each identified product. In some examples, the one or more color cameras 110 may be positioned to capture images of each identified product from various different angles. Additionally, executing the one or more applications stored in the memory 114 may include causing the POS workstation 102 to send the second image data captured by the color camera(s) 110, and the identified products corresponding to each image of the second image data, to the computing device 104, e.g., via the network 106. Moreover, in some examples, executing the one or more applications stored in the memory 114 may include causing the POS workstation 102 to send the second image data captured by the color camera(s) 110, and the identified products corresponding to each image of the second image data, to one or more external databases, such as, e.g., a product image database 124.

Furthermore, in some examples, the computer-readable instructions stored on the memory 114 may include instructions for carrying out any of the steps of the method 200, described in greater detail below with respect to FIG. 10, the method 300, described in greater detail below with respect to FIG. 11, and/or the method 400, described in greater detail below with respect to FIG. 12.

The computing device 104 may include a processor 116, and a memory 118. The processor 112, which may be, for example, one or more microprocessors, controllers, and/or any suitable type of processors, may interact with the memory 118 accessible by the one or more processors 116 (e.g., via a memory controller) to obtain, for example, computer-readable instructions stored in the memory 118. The computer-readable instructions stored in the memory 118 may cause the one or more processors 116 to execute one or more applications, including a textured three-dimensional mesh reconstruction application 120. For instance, executing the textured three-dimensional mesh reconstruction application 120 may include obtaining second image data, captured by the one or more color cameras 110, associated with various identified products, e.g., from the POS workstation 102 and/or from the product image database 124, and generating a textured three-dimensional mesh reconstruction for each identified product based on the second image data associated with each identified product.

In some examples, the textured three-dimensional mesh reconstruction application 120 may generate the textured three-dimensional mesh reconstruction for a given identified product by analyzing each image, of the second image data, associated with the identified product in order to segment the identified product from any background and/or user hands (or other non-product items) present in each image. The textured three-dimensional mesh reconstruction application 120 may then analyze the segmented portion of the image in order to determine a location of a barcode or other product label in the image, as well as a depth and texture associated with each pixel of the identified product in the image. Using the determined depth and texture associated with each pixel of the identified product in the image, the textured three-dimensional mesh reconstruction application 120 may generate a textured three-dimensional point cloud associated with the image. The textured three-dimensional mesh reconstruction application 120 may then stitch the textured three-dimensional point clouds associated with each image of the second image data associated with a given identified product together to generate a textured three-dimensional mesh associated with the identified product. For instance, in some examples, the textured three-dimensional mesh reconstruction application 120 may orient the textured three-dimensional point clouds from each image of the second image data, with respect to one another, based on the location of the barcodes or other product labels in each image, in order to stitch the textured three-dimensional point clouds together.

Additionally, in some examples, the textured three-dimensional mesh reconstruction application 120 may generate the textured three-dimensional mesh reconstruction for a given identified product by determining a shape associated with the identified product, generating a three-dimensional mesh associated with the determined shape of the identified product, and stitching (two-dimensional) images of the second image data to the generated three-dimensional mesh.

For instance, possible product shapes may include a bottle shape, a box shape, a can shape, a bag shape, etc. The database 126 may store an indication of product shapes associated with each identified product, and the textured three-dimensional mesh reconstruction application 120 may determine which shape is associated with a given identified product by accessing the database 126. Additionally or alternatively, in some examples, the textured three-dimensional mesh reconstruction application 120 may identify or determine the shape of the identified product by segmenting the identified product from the background, or any hands in the image. The textured three-dimensional mesh reconstruction application 120 may then analyze the segmented image of the identified product, e.g., using a neural network, to classify the shape associated with the identified product as one of a plurality of possible product shapes.

Once the textured three-dimensional mesh reconstruction application 120 generates a three-dimensional mesh representing the shape associated with the identified product, the textured three-dimensional mesh reconstruction application 120 may add texture to the three-dimensional mesh by stitching (two-dimensional) images from the second image data to the three-dimensional mesh in order to generate a textured three-dimensional mesh associated with the identified product.

For instance, the textured three-dimensional mesh reconstruction application 120 may stitch images of the second image data to respective faces, sides, or angles of the three-dimensional mesh. In some examples, the textured three-dimensional mesh reconstruction application 120 may determine the orientations of each of the images of the second image data in order to determine which images should be stitched to each face, side, or angle of the three-dimensional mesh. In some examples, the textured three-dimensional mesh reconstruction application 120 may determine the orientation of each image based on the location of a barcode or product label in each image. For instance, in some examples, the textured three-dimensional mesh reconstruction application 120 may segment the identified product from the background, or any hands in the image, and identify a location of a barcode or other product label in the segmented image. The textured three-dimensional mesh reconstruction application 120 may then determine the orientation of the product in the image based on the identified location of the barcode or other product label in the image, and use the determined orientation to stich the images of the second image data to the three-dimensional mesh in order to generate the textured three-dimensional mesh.

Additionally, in some examples, the computer-readable instructions stored on the memory 118 may include instructions for carrying out any of the steps of the method 200, described in greater detail below with respect to FIG. 10, the method 300, described in greater detail below with respect to FIG. 11, and/or the method 400, described in greater detail below with respect to FIG. 12.

Figure 10:
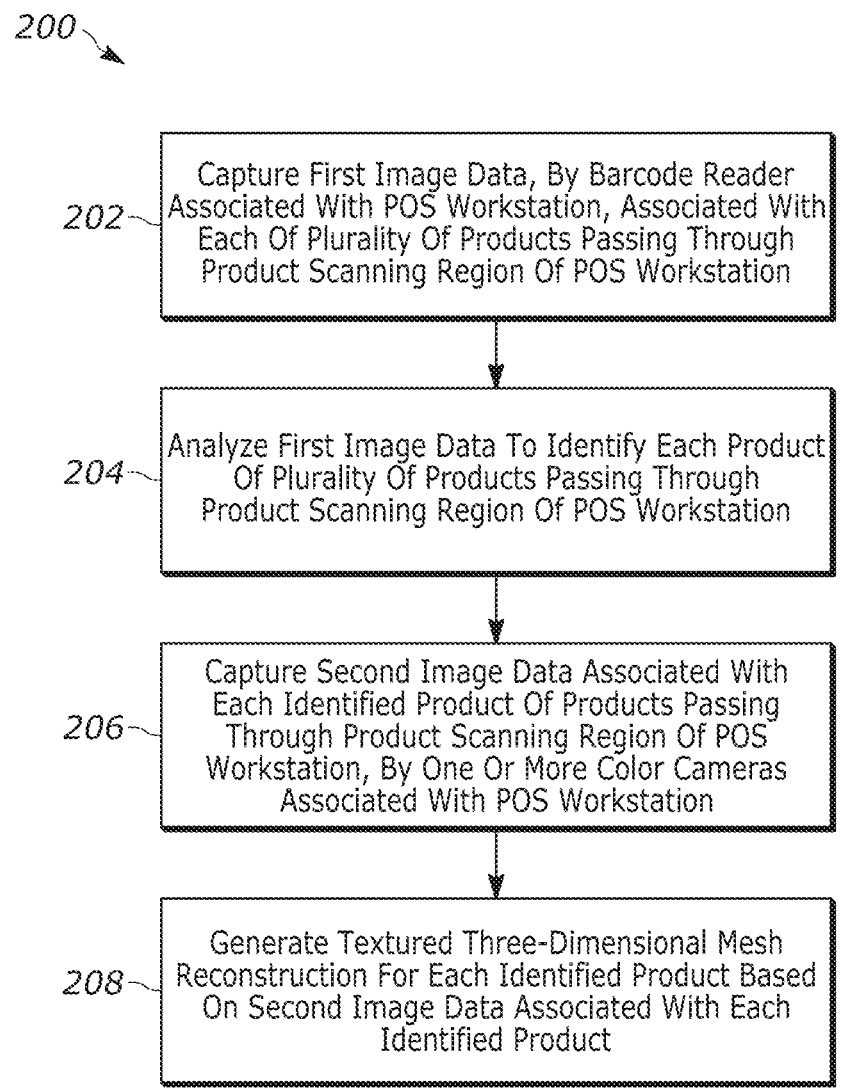
FIG. 10 illustrates a flow diagram of an example method for three-dimensional product reconstruction using multiple images collected at POS workstations, as may be implemented by the system of FIG. 9, in accordance with some examples provided herein.

FIG. 10 illustrates a block diagram of an example process 200 as may be implemented by the system of FIG. 9, for implementing example methods and/or operations described herein, including systems and methods for three-dimensional product reconstruction using multiple images collected at POS workstations. One or more steps of the method 200 may be implemented as a set of instructions stored on a computer-readable memory (e.g., memory 114 and/or memory 118) and executable on one or more processors (e.g., processors 112 and/or processors 116).

At block 202, a barcode reader associated with a point of sale (POS) workstation may capture first image data associated with each of a plurality of products passing through a product scanning region of the POS workstation. At block 204, barcode data from the first image data captured by the barcode reader may be analyzed to identify each product of the plurality of products passing through the product scanning region of the POS workstation.

At block 206, one or more color cameras associated with the POS workstation may capture second image data associated with each identified product, of the plurality of products passing through the product scanning region of the POS workstation.

At block 210, a textured three-dimensional mesh reconstruction may be generated for each identified product based on the second image data associated with each identified product. In some examples, implemented block 210 may include performing one or more of the methods and/or operations shown at FIG. 10, or performing one or more of the methods and/or operations shown at FIG. 11.

Figure 11:
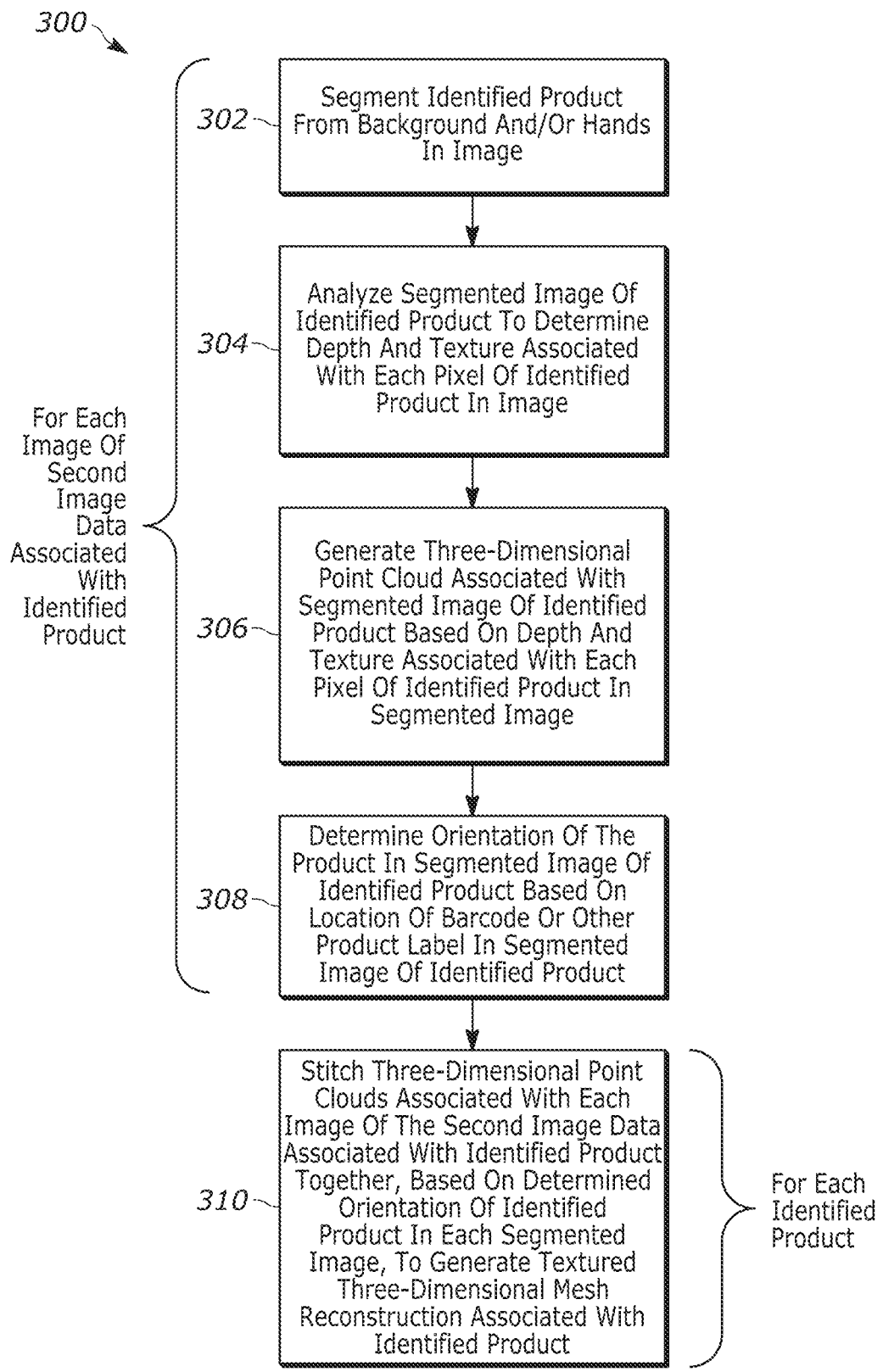
FIG. 11 illustrates a flow diagram of an example method for three-dimensional product reconstruction using three-dimensional point clouds associated with multiple images collected at POS workstations, as may be implemented by the system of FIG. 9, in accordance with some examples provided herein.

FIG. 11 illustrates a block diagram of an example process 300 as may be implemented by the system of FIG. 9, for implementing example methods and/or operations described herein, including systems and methods for three-dimensional product reconstruction using three-dimensional point clouds associated with multiple images collected at POS workstations. One or more steps of the method 300 may be implemented as a set of instructions stored on a computer-readable memory (e.g., memory 114 and/or memory 118) and executable on one or more processors (e.g., processors 112 and/or processors 116). Blocks 302-308 may be performed for each image of the second image data associated with each identified product, while block 310 may be performed for each of the identified products.

At block 302, the identified product may be segmented from the background, or any hands in the image. At block 304, the segmented image of the identified product may be analyzed to determine a depth and a texture associated with each pixel of the identified product in the image. At block 306, a three-dimensional point cloud associated with the segmented image of the identified product may be generated based on the depth and the texture associated with each pixel of the identified product.

At block 308, the orientation of the identified product in the segmented image of the identified product may be identified or determined based on the location of a barcode or other product label in the segmented image of the identified product, or the location of the barcode or other product label in the three-dimensional point cloud.

At block 310, the three-dimensional point clouds associated with each image of the second image data associated with the identified product may be stitched together to generate a textured three-dimensional mesh reconstruction associated with the identified product. In some examples, the three-dimensional point clouds may be stitched together based on the determined orientation of the product in each three-dimensional point cloud.

Figure 12:
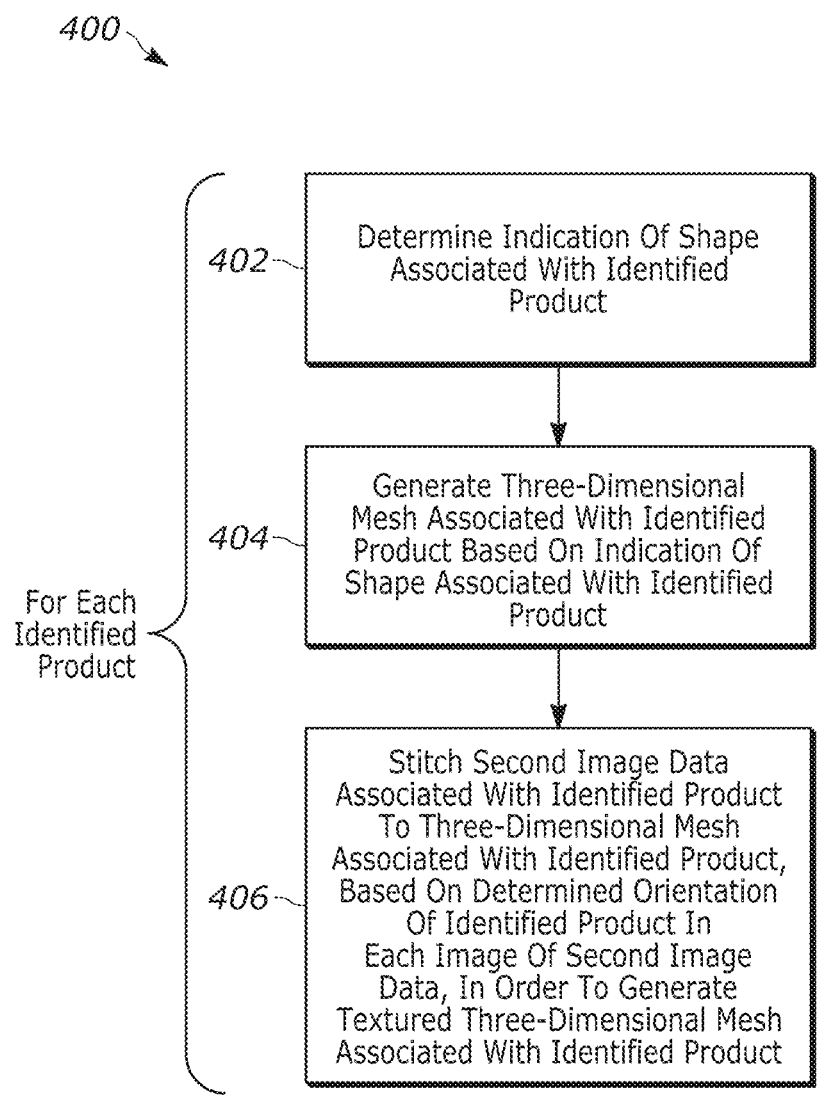
FIG. 12 illustrates a flow diagram of an example method for three-dimensional product reconstruction using multiple two-dimensional images collected at POS workstations and a three-dimensional mesh associated with the shape of the products, as may be implemented by the system of FIG. 9, in accordance with some examples provided herein.

FIG. 12 illustrates a block diagram of an example process 400 as may be implemented by the system of FIG. 9, for implementing example methods and/or operations described herein, including systems and methods for three-dimensional product reconstruction using multiple two-dimensional images collected at POS workstations and a three-dimensional mesh associated with the shape of the product. One or more steps of the method 400 may be implemented as a set of instructions stored on a computer-readable memory (e.g., memory 114 and/or memory 118) and executable on one or more processors (e.g., processors 112 and/or processors 116). Blocks 402-406 may be performed for each identified product.

At block 402, an indication of a shape associated with the identified product may be identified or determined. For instance, possible product shapes may include bottle, box, can, bag, etc. For instance, in some examples, a database may store an indication of product shapes associated with each identified product, and the shape associated with a given identified product may be determined by accessing the database. Additionally, in some examples, identifying or determining the shape of the identified product may include segmenting the identified product from the background, or any hands in the image. The segmented image of the identified product may then be analyzed, e.g., using a neural network, to classify the shape associated with the identified product as one of a plurality of possible product shapes.

At block 404, a three-dimensional mesh associated with the identified product may be generated based on the indication of the shape associated with the identified product.

For instance, a three-dimensional mesh associated with a bottle shape, a box shape, a can shape, a bag shape, etc., may be generated based on the indication of the shape associated with the identified product.

At block 406, the second image data associated with the identified product may be stitched to the three-dimensional mesh associated with the identified product in order to generate a textured three-dimensional mesh associated with the identified product. For instance, the images of the second image data may be stitched to respective faces, sides, or angles of the three-dimensional mesh. In some examples, the orientation of the images of the second image data may be determined in order to determine which images should be stitched to each face, side, or angle of the three-dimensional mesh. In some examples, the orientation of each image may be determined based on the location of a barcode or product label in each image. For instance, in some examples, the method 400 may further include segmenting the identified product from the background, or any hands in the image, and identifying a location of a barcode or other product label in the segmented image. The orientation of the product in the image may then be determined based on the identified location of the barcode or other product label in the image, and used to determine how to stich the images of the second image data to the three-dimensional mesh in order to generate the textured three-dimensional mesh.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for three-dimensional product reconstruction using multiple images collected at POS workstations, comprising:
   capturing, by a barcode reader associated with a point of sale (POS) workstation, first image data associated with a plurality of products passing through a product scanning region of the POS workstation;
   analyzing barcode data from the first image data captured by the barcode reader to identify at least some of the plurality of products passing through the product scanning region of the POS workstation;
   responsive to identifying a product, from the plurality of products, resulting in an identified product, capturing, by one or more color cameras associated with the POS workstation, second image data associated with the identified product; and
   generating, by a processor, a textured three-dimensional mesh reconstruction for the identified product based on the second image data associated with the identified product,
   wherein generating the textured three-dimensional mesh reconstruction associated with the identified product based on the second image data associated with the identified product includes:
      for each image of the second image data associated with the identified product;
         segmenting, by the processor, the identified product from the background, or any hands in the image;
         analyzing, by the processor, the segmented image of the identified product to determine a depth and a texture associated with each pixel of the identified product in the image; and
         generating, by the processor, a three-dimensional point cloud associated with the segmented image of the identified product based on the depth and the texture associated with each pixel of the identified product; and
      stitching, by the processor, the three-dimensional point clouds associated with each image of the second image data associated with the identified product together to generate a textured three-dimensional mesh reconstruction associated with the identified product, and
   wherein stitching, by the processor, the three-dimensional point cloud associated with each image of the second image data associated with the identified product together to generate a textured three-dimensional mesh reconstruction associated with the product includes:
      for each three-dimensional point cloud associated with the identified product:
         identifying, by the processor, a location of a barcode or other product label in the three-dimensional point cloud; and
         determining, by the processor, an orientation of the product in the three-dimensional point cloud based on the identified location of the barcode or other product label in the three-dimensional point cloud; and
      stitching, by the processor, the three-dimensional point clouds associated with each image of the second image data associated with the identified product together to generate the textured three-dimensional mesh reconstruction associated with the product, based on the determined orientation of the product in each three-dimensional point cloud.

2. The method of claim 1, wherein generating the textured three-dimensional mesh reconstruction for the identified product based on the second image data associated with the identified product further includes:
   determining, by the processor, an indication of a shape associated with the identified product;
   generating, by the processor, a three-dimensional mesh associated with the identified product based on the indication of the shape associated with the identified product; and
   stitching, by the processor, the second image data associated with the identified product to the three-dimensional mesh associated with the identified product in order to generate a textured three-dimensional mesh associated with the identified product.

3. The method of claim 2, wherein determining the indication of the shape associated with the identified product includes:
   accessing, by the processor, a database storing an indication of a product shape associated with the identified product.

4. The method of claim 2, wherein determining the indication of the shape associated with the product shown in the image includes:
   for at least one image of the second image data associated with the identified product:

segmenting, by the processor, the identified product from the background, or any hands in the image;

analyzing, by the processor, the segmented image of the identified product using a neural network to classify the shape associated with the identified product as one of a plurality of possible product shapes.

5. The method of claim 2, wherein stitching the second image data associated with the identified product to the three-dimensional mesh associated with the identified product in order to generate the textured three-dimensional mesh associated with the identified product includes:

for each image of the second image data associated with the identified product:
segmenting, by the processor, the identified product from the background, or any hands in the image;
identifying, by the processor, a location of a barcode or other product label in the image; and
determining, by the processor, an orientation of the product in the image based on the identified location of the barcode or other product label in the image; and stitching, by the processor, each image of the second image data associated with the identified product to the three-dimensional mesh associated with the identified product based on the orientation of the product in each image of the second image data associated with the identified product.

6. A system for three-dimensional product reconstruction using multiple images collected at POS workstations, comprising:

a barcode reader associated with a point of sale (POS) workstation configured to capture first image data associated with a plurality of products passing through a product scanning region of the POS workstation and analyze barcode data from the first image data to identify at least some of the plurality of products passing through the product scanning region of the POS workstation;

one or more color cameras associated with the POS workstation configured to, responsive to the barcode reader identifying a product, from the plurality of products, resulting in an identified product, capture second image data associated with the identified product;

a processor; and a memory storing non-transitory, computer-readable instructions, that, when executed by the processor, cause the processor to generate a textured three-dimensional mesh reconstruction for the identified product based on the second image data associated with the identified product, wherein the instructions, that cause the processor to generate the textured three-dimensional mesh reconstruction associated with the identified product based on the second image data associated with the identified product, include instructions that cause the processor to:

for each image of the second image data associated with the identified product;
segment the identified product from the background, or any hands in the image;
analyze the segmented image of the identified product to determine a depth and a texture associated with each pixel of the identified product in the image; and
generate a three-dimensional point cloud associated with the segmented image of the identified product based on the depth and the texture associated with each pixel of the identified product; and stitch the three-dimensional point clouds associated with each image of the second image data associated with the identified product together to generate a textured three-dimensional mesh reconstruction associated with the identified product, and wherein the instructions, that cause the processor to stitch the three-dimensional point cloud associated with each image of the second image data associated with the identified product together to generate a textured three-dimensional mesh reconstruction associated with the product, include instructions that cause the processor to:

for each three-dimensional point cloud associated with the identified product:
identify a location of a barcode or other product label in the three-dimensional point cloud; and
determine an orientation of the product in the three-dimensional point cloud based on the identified location of the barcode or other product label in the three-dimensional point cloud; and stitch the three-dimensional point clouds associated with each image of the second image data associated with the identified product together to generate the textured three-dimensional mesh reconstruction associated with the product, based on the determined orientation of the product in each three-dimensional point cloud.

7. The method of claim 6, wherein the instructions, that cause the processor to generate the textured three-dimensional mesh reconstruction for the identified product based on the second image data associated with the identified product, include instructions that cause the processor to:

determine an indication of a shape associated with the identified product;
generate a three-dimensional mesh associated with the identified product based on the indication of the shape associated with the identified product; and
stitch the second image data associated with the identified product to the three-dimensional mesh associated with the identified product in order to generate a textured three-dimensional mesh associated with the identified product.

8. The method of claim 7, wherein the instructions, that cause the processor to determine the indication of the shape associated with the identified product, include instructions that cause the processor to access a database storing an indication of a product shape associated with the identified product.

9. The method of claim 7, wherein the instructions, that cause the processor to determine the indication of the shape associated with the product shown in the image, include instructions causing the processor to:

for at least one image of the second image data associated with the identified product:
segment the identified product from the background, or any hands in the image; and
analyze the segmented image of the identified product using a neural network to classify the shape associated with the identified product as one of a plurality of possible product shapes.

10. The method of claim 7, wherein the instructions, that cause the processor to stitch the second image data associated with the identified product to the three-dimensional mesh associated with the identified product in order to generate the textured three-dimensional mesh associated with the identified product, include instructions that cause the processor to:
    for each image of the second image data associated with the identified product:
        segment the identified product from the background, or any hands in the image;
        identify a location of a barcode or other product label in the image; and
        determine an orientation of the product in the image based on the identified location of the barcode or other product label in the image; and
    stitch each image of the second image data associated with the identified product to the three-dimensional mesh associated with the identified product based on the orientation of the product in each image of the second image data associated with the identified product.

\* \* \* \* \*